US012783865B2

(12) United States Patent
Son et al.

(10) Patent No.: US 12,783,865 B2
(45) Date of Patent: Nov. 3, 2026

(54) HIGH-SPEED PROCESSING METHOD OF NEURAL NETWORK AND APPARATUS USING THE HIGH-SPEED PROCESSING METHOD

(71) Applicant: SAMSUNG ELECTRONICS CO., LTD., Suwon-si (KR)

(72) Inventors: ChangYong Son, Anyang-si (KR); Jinwoo Son, Seoul (KR); Sangil Jung, Suwon-si (KR); Chang Kyu Choi, Seongnam-si (KR); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1119 days.

(21) Appl. No.: 16/273,662

(22) Filed: Feb. 12, 2019

(65) Prior Publication Data

US 2019/0251436 A1 Aug. 15, 2019

(30) Foreign Application Priority Data

Feb. 14, 2018 (KR) ........................ 10-2018-0018818
Mar. 19, 2018 (KR) ........................ 10-2018-0031511
Aug. 13, 2018 (KR) ........................ 10-2018-0094311

(51) Int. Cl.
*G06N 3/08* (2023.01)
*G06N 3/0464* (2023.01)
(Continued)

(52) U.S. Cl.
CPC ............. *G06N 3/08* (2013.01); *G06N 3/0464* (2023.01); *G06N 3/048* (2023.01); *G06N 3/063* (2013.01); *G06F 18/21* (2023.01)

(58) Field of Classification Search
CPC .......... G06N 3/08; G06N 3/04; G06N 3/0454; G06N 3/0481; G06N 3/063; G06K 9/6217
See application file for complete search history.

(56) References Cited

U.S. PATENT DOCUMENTS

2006/0095260 A1 5/2006 Cho et al.
2011/0029471 A1 2/2011 Chakradhar et al.
(Continued)

FOREIGN PATENT DOCUMENTS

KR 10-2011-0048200 A 5/2011

OTHER PUBLICATIONS

Lin, Talathi, and Annapureddy, "Fixed Point Quantization of Deep Convolutional Networks, Proceedings of the 33rd International Conference on Machine Learning", New York, NY, USA, 2016. JMLR: W&CP vol. 48 (Year: 2016).*
(Continued)

*Primary Examiner* — Michelle T Bechtold
*Assistant Examiner* — Moriam Mosunmola Godo
(74) *Attorney, Agent, or Firm* — NSIP Law

(57) ABSTRACT

A processing method using a neural network includes generating output maps of a current layer of the neural network by performing a convolution operation between input maps of the current layer and weight kernels of the current layer, determining a lightweight format for the output maps of the current layer based on a distribution of at least a portion of activation data being processed in the neural network, and lightening activation data corresponding to the output maps of the current layer to have a low bit width based on the determined lightweight format.

17 Claims, 12 Drawing Sheets

(51) Int. Cl.

| | |
|---|---|
| ***G06N 3/048*** | (2023.01) |
| ***G06N 3/063*** | (2023.01) |
| *G06F 18/21* | (2023.01) |

(56) References Cited

U.S. PATENT DOCUMENTS

| | | | | |
|---|---|---|---|---|
| 2016/0328644 | A1* | 11/2016 | Lin | G06N 3/04 |
| 2016/0328646 | A1* | 11/2016 | Lin | G06V 10/454 |
| 2016/0328647 | A1 | 11/2016 | Lin et al. | |
| 2017/0011288 | A1* | 1/2017 | Brothers | G06N 3/063 |
| 2017/0015156 | A1 | 1/2017 | McClellan | |
| 2017/0286830 | A1 | 10/2017 | El-Yaniv et al. | |
| 2017/0323197 | A1 | 11/2017 | Gibson et al. | |
| 2018/0232629 | A1* | 8/2018 | Du | G06N 3/04 |
| 2019/0171927 | A1* | 6/2019 | Diril | G06N 3/08 |
| 2020/0042871 | A1* | 2/2020 | Francini | G06N 3/045 |

OTHER PUBLICATIONS

Jacob, Benoit, et al., "Quantization and Training of Neural Networks for Efficient Integer-Arithmetic-Only Inference", *Google Inc*., Dec. 2017, pp. 1-13.

Wang, Yizhi, et al., "An Energy-Efficient Architecture for Binary Weight Convolutional Neural Networks", IEEE Transactions on Very Large Scale Integration Systems, Feb. 2018, pp. 280-293, vol. 26, No. 2.

Jung, Sangil, et al., "Joint Training of Low-Precision Neural Network with Quantization Interval Parameters", Aug. 2018, pp. 1-11.

Extended European Search Report issued on Jul. 15, 2019 in corresponding European Application No. 19156720.5.

* cited by examiner

FIG. 5

500

| Layer | Channel | Lightweight format | Lightened weight kernel |
|---|---|---|---|
| $L_1$ | $C_{11}$ | $Q_{11}$ | $WK_{11}$ |
| | $C_{12}$ | $Q_{12}$ | $WK_{12}$ |
| | ⋮ | ⋮ | ⋮ |
| | $C_{1m}$ | $Q_{1m}$ | $WK_{1m}$ |
| $L_2$ | … | … | … |
| ⋮ | ⋮ | ⋮ | ⋮ |
| $L_n$ | … | … | … |

HIGH-SPEED PROCESSING METHOD OF NEURAL NETWORK AND APPARATUS USING THE HIGH-SPEED PROCESSING METHOD

CROSS-REFERENCE TO RELATED APPLICATION

This application claims the benefit under 35 USC § 119(a) of Korean Patent Application No. 10-2018-0018818 filed on Feb. 14, 2018, Korean Patent Application No. 10-2018-0031511 filed on Mar. 19, 2018, and Korean Patent Application No. 10-2018-0094311 filed on Aug. 13, 2018, in the Korean Intellectual Property Office, the entire disclosures of which are incorporated herein by reference for all purposes.

BACKGROUND

1. Field

The following description relates to a high-speed processing method of a neural network and an apparatus using the high-speed processing method.

2. Description of Related Art

A technological automation of recognition, for example, has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processing method using a neural network includes generating output maps of a current layer of the neural network by performing a convolution operation between input maps of the current layer and weight kernels of the current layer, determining a lightweight format for the output maps of the current layer based on a distribution of at least a portion of activation data being processed in the neural network, and lightening activation data corresponding to the output maps of the current layer to have a low bit width based on the determined lightweight format.

The determining of the lightweight format may include determining the lightweight format for the output maps based on a maximum value of the output maps of the current layer.

The lightening may include lightening, to have the low bit width, input maps of a subsequent layer of the neural network corresponding to the output maps of the current layer, based on the determined lightweight format.

The lightening may include lightening, to have the low bit width, the input maps of the subsequent layer of the neural network corresponding to the output maps of the current layer by performing a shift operation on the input maps of the subsequent layer using a value corresponding to the determined lightweight format.

The processing method may further include loading the output maps of the current layer from a memory, and updating a register configured to store the maximum value of the output maps of the current layer based on the loaded output maps of the current layer. The determining of the lightweight format may be performed based on a value stored in the register.

The determining of the lightweight format may include predicting the maximum value of the output maps of the current layer based on a maximum value of output maps of a previous layer of the neural network, and determining the lightweight format for the output maps of the current layer based on the predicted maximum value of the output maps of the current layer.

The lightening may include lightening, to have the low bit width, the output maps of the current layer based on the determined lightweight format.

The lightening may include lightening, to have the low bit width, the output maps of the current layer with a high bit width by performing a shift operation on the output maps of the current layer using a value corresponding to the determined lightweight format.

The processing method may further include updating a register configured to store the maximum value of the output maps of the current layer based on the output maps of the current layer generated by the convolution operation. A maximum value of output maps of the subsequent layer of the neural network may be predicted based on a value stored in the register.

The processing method may further include obtaining a first weight kernel corresponding to a first output channel that is currently being processed in the current layer by referring to a database including weight kernels by each layer and output channel. The generating of the output maps of the current layer may include generating a first output map corresponding to the first output channel by performing a convolution operation between the input maps of the current layer and the first weight kernel. The first weight kernel may be determined independently from a second weight kernel corresponding to a second output channel of the current layer.

The input maps of the current layer and the weight kernels of the current layer may have the low bit width, and the output maps of the current layer may have the high bit width.

In another general aspect, a processing apparatus using a neural network includes a processor, and a memory including an instruction readable by the processor. When the instruction is executed by the processor, the processor may be configured to generate output maps of a current layer of the neural network by performing a convolution operation between input maps of the current layer and weight kernels of the current layer, determine a lightweight format for the output maps of the current layer based on a distribution of at least a portion of activation data being processed in the neural network, and lighten activation data corresponding to the output maps of the current layer to have a low bit width based on the determined lightweight format.

In still another general aspect, a processing method using a neural network includes initiating the neural network including a plurality of layers, generating output maps of a current layer of the neural network by performing a convolution operation between input maps of the current layer and weight kernels of the current layer, determining a lightweight format for the output maps of the current layer, the lightweight format which is not determined before the neural network is initiated, and lightening activation data corresponding to the output maps of the current layer based on the determined lightweight format.

The initiating of the neural network may include inputting input data to the neural network for inference on the input data.

In another general aspect, a processing method includes performing an operation between input data of a current layer of a neural network and a weight kernel of the current layer to generate first output maps of the current layer having a high bit width, the input data and the weight kernel having a low bit width; generating second output maps of the current layer with the high bit width by applying the first output maps to an activation function; outputting a maximum value of the second output maps; determining a lightweight format of an input map of a subsequent layer of the neural network based on the maximum value, the input map having the high bit width; and lightening the input map to have the low bit width based on the lightweight format.

Other features and aspects will be apparent from the following detailed description, the drawings, and the claims.

BRIEF DESCRIPTION OF DRAWINGS

FIG. 5 is a diagram illustrating an example of a lookup table including lightweight data.

Figure 1:
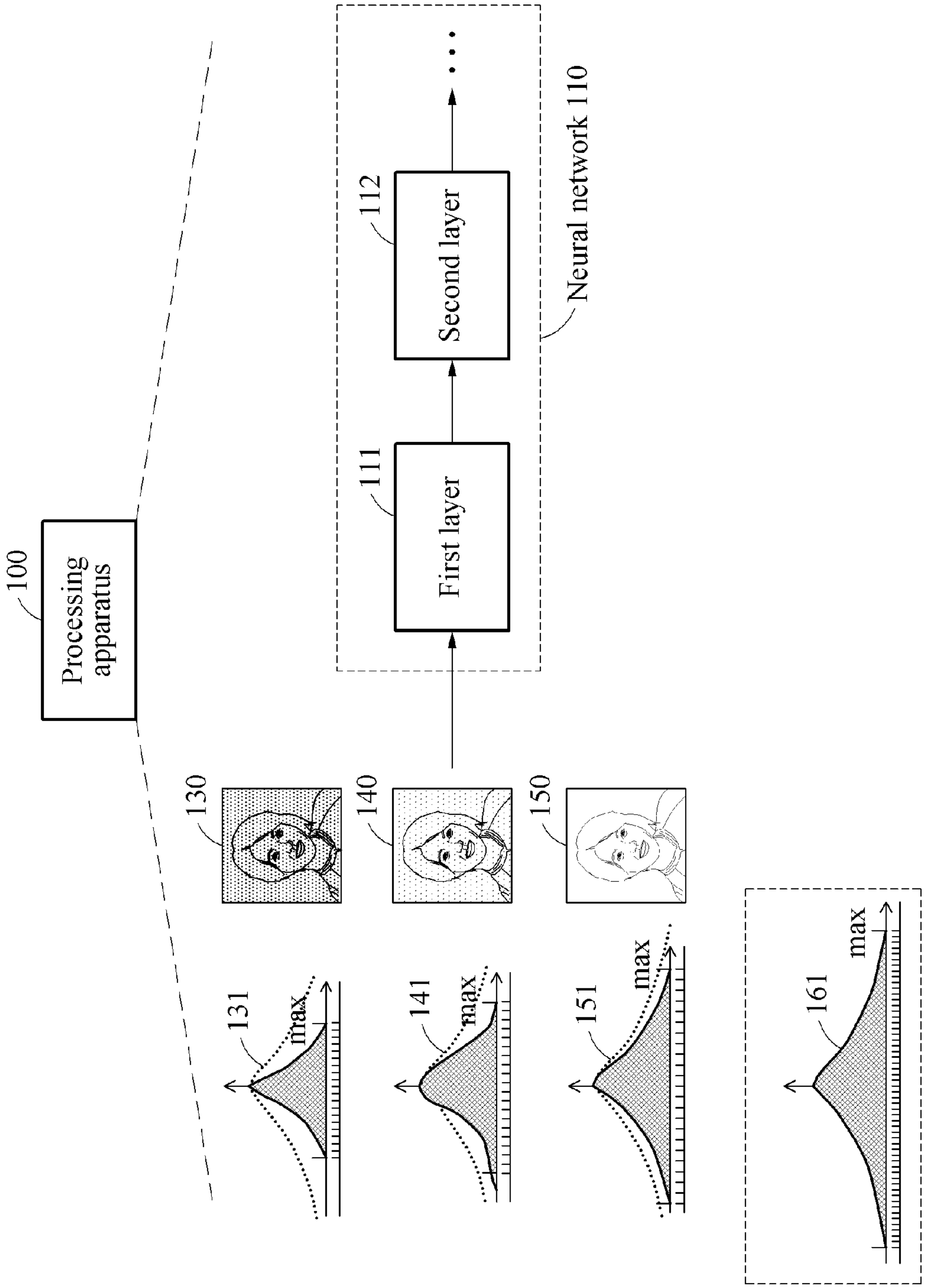
FIG. 1 is a diagram illustrating an example of a processing apparatus and an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of a processing apparatus and an example of a neural network. Referring to FIG. 1, a processing apparatus 100 lightens data for a neural network 110 to have the lightened data with a low bit width, and processes operations of the neural network 110 using the lightened data. The lightened data is interchangeably referred to as lightweight data throughout this specification. For example, the operations of the neural network 110 may include recognizing or verifying an object in an input image. At least a portion of processing operations that are associated with the neural network 110 and include lightening may be embodied by software, hardware including a neural processor, or a combination thereof.

The neural network 110 may include a convolutional neural network (CNN). The neural network 110 may perform object recognition or object verification by mapping input data and output data that have a nonlinear relationship therebetween through deep learning. The deep learning refers to a machine learning method used to perform image or speech recognition from a big dataset. The deep learning may also be construed as a problem-solving process for optimization to find a point where energy is minimized while training the neural network 110 using provided training data. Through the deep learning, for example, supervised or unsupervised learning, a weight corresponding to an architecture or a model of the neural network 110 may be obtained, and input data and output data may be mapped to each other based on the obtained weight.

The neural network 110 includes a plurality of layers. The layers include an input layer, at least one hidden layer, and an output layer. As illustrated in FIG. 1, a first layer 111 and a second layer 112 are a portion of the layers. In the example illustrated in FIG. 1, the second layer 112 is a subsequent layer of the first layer 111 and is processed after the first layer 111 is processed. Although the two layers 111 and 112 are illustrated as example layers in FIG. 1 for convenience of description, the neural network 110 may include more layers in addition to the two layers 111 and 112.

In the CNN, data input to each layer of the CNN may also be referred to as an input feature map, and data output from each layer thereof may also be referred to as an output feature map. Hereinafter, the input feature map will be simply referred to as an input map and the output feature map as an output map. According to an example, the output map may correspond to a result of a convolution operation in each layer or a result of processing an activation function in each layer. The input map and the output map may also be referred to as activation data. That is, the result of the convolution operation in each layer or the result of processing the activation function in each layer may also be referred to as the activation data. In addition, an input map in the input layer may correspond to image data of an input image.

To process operations associated with the neural network 110, the processing apparatus 100 performs a convolution operation between an input map of each layer and a weight kernel of each layer and generates an output map based on a result of the convolution operation. In the CNN, the deep learning may be performed on a convolution layer. The processing apparatus 100 generates the output map by applying an activation function to the result of the convolution operation. The activation function may include, for example, sigmoid, hyperbolic tangent (tanh), and rectified linear unit (ReLU). The neural network 110 may be assigned with nonlinearity by the activation function. The neural network 110 may have a capacity sufficient to implement a function, when a width and a depth of the neural network 110 are sufficiently large. The neural network 110 may achieve optimal performance when the neural network 110 learns or is trained with a sufficient amount of training data through a desirable training process.

The CNN may be effective in processing two-dimensional (2D) data, such as, for example, images. The CNN may perform a convolution operation between an input map and a weight kernel to process 2D data. However, a great amount of time and resources may be needed to perform such a convolution operation in an environment where resources are limited, for example, a mobile terminal.

In an example, the processing apparatus 100 performs a convolution operation using lightened or lightweight data. Lightening described herein refers to a process of transforming data with a high bit width into data with a low bit width. The low bit width may have a relatively less (lower) bit number compared to the high bit width. For example, in a case in which the high bit width is 32 bits, the low bit width may be 16 bits, 8 bits, or 4 bits. In a case in which the high bit width is 16 bits, the low bit width may be 8 bits or 4 bits. Detailed numeric values of the high bit width and the low bit width are not limited to the examples described in the foregoing, and various values may be applied to the high bit width and the low bit width according to examples.

The processing apparatus 100 lightens data based on a fixed-point transformation. When a floating-point variable is multiplied by an exponent during the fixed-point transformation, the variable may be integerized. Herein, the exponent to be multiplied may be defined as a Q-format, and a Q-format to be used to transform data with a high bit width into data with a low bit width may be defined as a lightweight format. The lightweight format will be described in detail later.

The neural network 110 may be trained based on training data in a training process, and perform inference operations such as, for example, classification, recognition, and detection associated with input data, in an inference process. When a weight kernel is determined through the training process, the weight kernel may be lightened to be a format with a low bit width and the lightened weight kernel may be stored. The training may be performed in an offline stage or an online stage. Recently, training in the online stage is available due to the introduction of training-accelerable hardware such as a neural processor. The weight kernel may be determined in advance, which indicates that the weight kernel may be determined before input data to be used for inference is input to the neural network 110.

In an example, a weight kernel may be lightened for each layer and channel. The neural network 110 may include a plurality of layers, and each layer may include a plurality of channels corresponding to the number of weight kernels. A weight kernel may be lightened for each layer and channel, and the lightened weight kernel may be stored for each layer and channel through a database. The database may include, for example, a lookup table.

For example, when a size of a weight kernel in an i-th layer is $K_i*K_i$, the number of input channels is $C_i$, and the number of output channels is $D_i$, the weight kernel of the i-th layer may be represented by $((K_i*K_i)*C_i*D_i)$. In this example, a weight kernel of the CNN may be represented by $((K_i*K_i)*C_i*D_i)_l$. In this example, when a matrix multiplication between an input map and a weight kernel is performed for a convolution operation, a weight kernel needed for an operation to generate a single output map may be represented by (K*K)*C. Herein, based on the weight kernel of (K*K)*C, a single output channel may be determined, and thus lightening of a weight kernel by a unit of (K*K)*C may be represented as lightening of a weight kernel for each output channel.

It is desirable that values in a weight kernel of a minimum unit have a same lightweight format. When a weight kernel is lightened for each channel, which is a minimum unit, a resolution that may be represented with a same number of bits may be maximized. For example, when a weight kernel is lightened by a unit of layer, a lightweight format may be set to be relatively lower to prevent an overflow and a numerical error may thus occur. When a weight kernel is lightened by a unit of channel, an information loss may be reduced because a data distribution in a smaller unit may be applied, as compared with when the weight kernel is lightened by a unit of layer. In an example, a lightweight format may be determined based on a data distribution of weight kernel for each channel, and a weight kernel may thus be lightened by a minimum unit based on the determined lightweight format. Thus, wasted bits may be minimized and an information loss may also be minimized.

A convolution operation may correspond to a multiplication and accumulation (MAC) operation, and thus Q-formats or lightweight formats of data, for example, weight kernels, may need to be matched to be the same to process cumulative addition through a register. When the Q-formats or the lightweight formats of the data for which the cumulative addition is processed are not matched, a shift operation may need to be additionally performed to match the Q-formats or the lightweight formats. In an example, when Q-formats or lightweight formats of weight kernels in a certain channel are the same, the shift operation performed to match the Q-formats or the lightweight formats during a convolution operation between an input map of the channel and a weight kernel of the channel may be omitted.

As described, when a lightweight format for an input map and an output map is determined in advance in an offline stage, a resolution of data to represent the input map and the output map in an online stage may be reduced significantly. The input map and the output map may have an extremely large dynamic range, and thus a low lightweight format may be used to prevent a limited length for representation of data and an overflow of an operation result. Such a fixed use of the low lightweight format may restrict the number of bits that represent the data.

The processing apparatus 100 may adaptively determine a lightweight format for an input map and an output map to increase a resolution and prevent a numerical error. The adaptive determining of a lightweight format may indicate determining, after the neural network 110 is initiated, a lightweight format which is not yet determined before the neural network 110 is initiated. The initiating of the neural network 110 may indicate that the neural network 110 is ready for inference. For example, the initiating of the neural network 110 may include loading the neural network 110 into a memory, or inputting input data to be used for the inference to the neural network 110 after the neural network 110 is loaded into the memory.

In the example of FIG. 1, a graph 131 indicates a data distribution of pixel values of an input image 130, a graph 141 indicates a data distribution of pixel values of an input image 140, and a graph 151 indicates a data distribution of pixel values of an input image 150. The input image 130 includes data of relatively small values, and the input image 150 includes data of relatively great values. When processing each of the input images 130, 140, and 150 using the neural network 110, the processing apparatus 100 may adaptively set different lightweight formats for the input images 130, 140, and 150, respectively. For example, the processing apparatus 100 may apply a high lightweight format to a dataset of a small value, for example, the input image 130, and a low lightweight format to a dataset of a great value, for example, the input image 150.

For example, when a dataset corresponding to a graph 161 is represented by 16 bits, a resolution of 1/64 steps may be obtained from a lightweight format Q6. The lightweight format Q6 and the resolution of 1/64 steps may indicate a resolution that may use six decimal places. When a lightweight format increases and a step decreases, it is possible to represent a higher resolution. A dataset corresponding to the graph 131 may have a small value, and thus the resolution of 1/64 steps may be obtained from the lightweight format Q6 although the dataset is represented by 8 bits. As described above, data may be relatively accurately represented with a low bit width based on a corresponding distribution. Data of the graph 141 may have a greater value than data of the graph 131, and thus a lightweight format Q4 and a resolution of 1/16 steps may be applied when it is represented by 8 bits. Data of the graph 151 may have a greater value than the data of the graph 141, and thus a lightweight format Q3 and a resolution of 1/8 steps may be applied when it is represented by 8 bits. Such adaptive lightening may be applied to each layer of the neural network 110.

For dynamic lightening, the processing apparatus 100 may generate output maps of a current layer of the neural network 110 by performing a convolution operation between input maps of the current layer and weight kernels of the current layer, and determine a lightweight format for the output maps of the current layer based on a distribution of at least a portion of activation data processed in the neural network 110. The processing apparatus 100 may lighten activation data corresponding to the output maps of the current layer to have a low bit width based on the determined lightweight format.

In an example, the processing apparatus 100 may determine the lightweight format for the output maps of the current layer based on a maximum value of the output maps of the current layer, and lighten input maps of a subsequent layer of the current layer corresponding to the output maps of the current layer to have a low bit width based on the determined lightweight format. In another example, the processing apparatus 100 may predict a maximum value of the output maps of the current layer based on a maximum value of output maps of a previous layer of the current layer, determine the lightweight format for the output maps of the current layer based on the predicted maximum value of the output maps of the current layer, and lighten the output maps of the current layer to have a low bit width based on the determined lightweight format.

The adaptive lightening for input and output maps may be performed in a training process and an inference process. In the training process, input and output maps based on training data may be lightened. In the inference process, input and output maps based on input data which is a target for inference may be lightened. Herein, training of the neural network 110 may be performed in at least one of an offline stage or an online stage. That is, the adaptive lightening may be applied to training data used for offline training and online training, and to input data used in the inference process.

To lighten a dataset such as an input map and an output map, there needs to be additional operations, for example, a first memory access operation to detect a maximum value of the dataset, and a second memory access operation to apply a lightweight format to the dataset based on the detected maximum value. However, when these additional operations are performed to lighten the dataset, an additional computing resource may be consumed and a data processing speed may be degraded. According to an example, the additional operations may be minimized by lightening input and output maps.

In an example, the processing apparatus 100 may obtain a maximum value of an output map with a high bit width of the first layer 111 when storing the output map in a memory from a register, load an input map with a high bit width of the second layer 112 before performing a convolution operation on the second layer 112, and lighten the loaded input map to be an input map with a low bit width based on the obtained maximum value. Through such operations described in the foregoing, the first memory access operation may be omitted.

In another example, the processing apparatus 100 may predict a maximum value of an output map of the second layer 112 using a maximum value of an output map of the first layer 111, and lighten the output map of the second layer 112 based on the predicted maximum value. Through such operations described in the foregoing, the first memory access operation and the second memory access operation may be omitted.

The examples described herein may be applied to maximize a processing speed or a memory usage and effectively implement recognition and verification technology in a limited embedded environment, such as, for example, a smartphone. In addition, the examples may be applied to accelerate a deep neural network (DNN) while minimizing degradation of performance of the DNN and to design an effective structure of a hardware accelerator.

Figure 2:
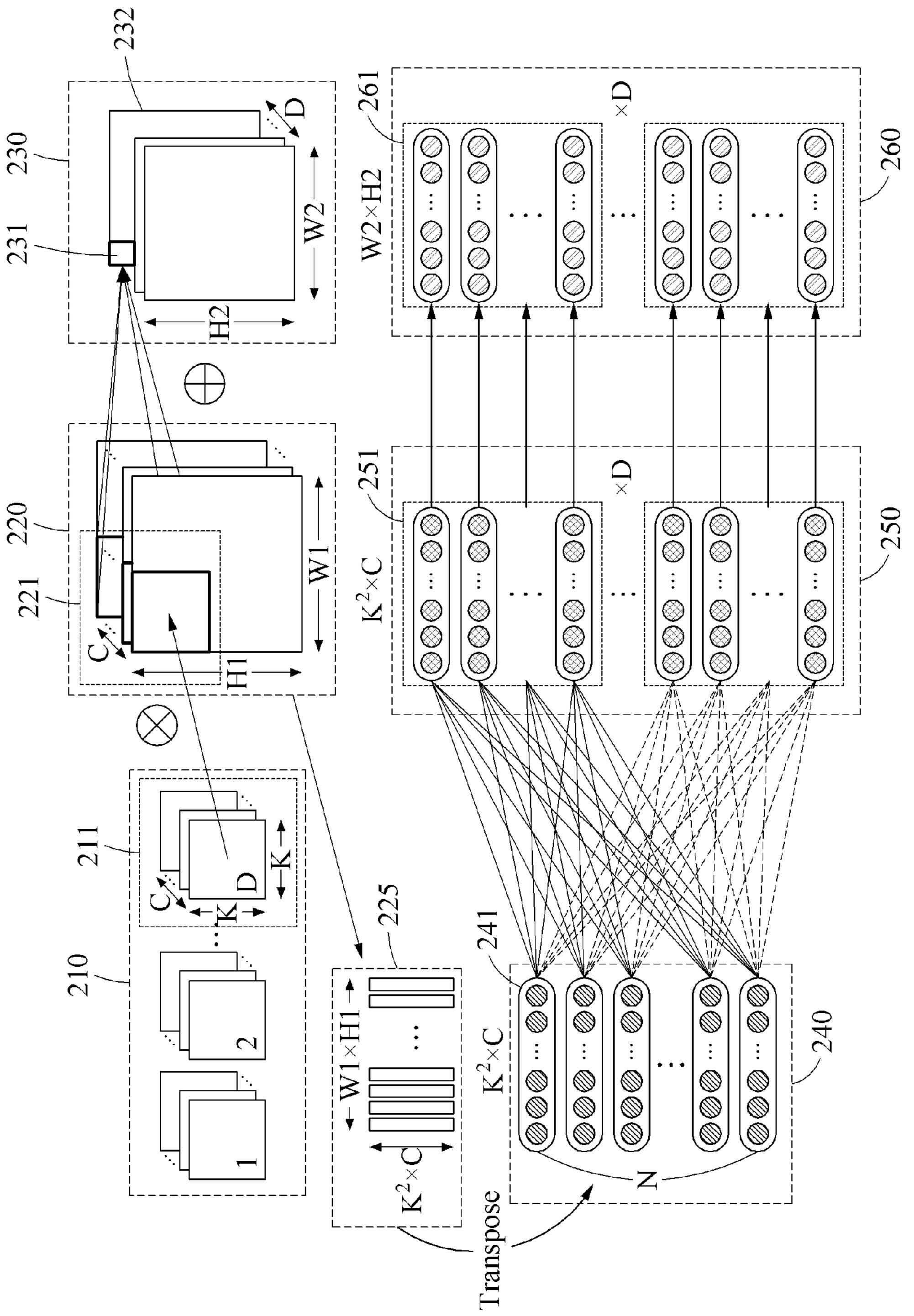
FIG. 2 is a diagram illustrating an example of an architecture of a three-dimensional (3D) convolutional neural network (CNN).

FIG. 2 is a diagram illustrating an example of an architecture of a three-dimensional (3D) CNN. The 3D CNN may correspond to one layer in the neural network 110 of FIG. 1.

Referring to FIG. 2, output maps 230 are generated based on a convolution operation between weight kernels 210 and input maps 220. In the example illustrated in FIG. 2, a size of a single weight kernel of a weight kernel group 211 is K*K, and the weight kernel group 211 corresponding to a single output channel includes C sub-kernels. For example, in a first layer, C sub-kernels may correspond to red, green, and blue (RGB) components, respectively, in which C may correspond to the number of input channels. The number of weight kernel groups of the weight kernels 210 is D, and D may correspond to the number of output channels. Based on a convolution operation between the weight kernel group 211 and a region 221 of the input maps 220, a region 231 of an output map 232 is determined. In a similar way, convolution operations between the weight kernel group 211 and the input maps 220 are performed in sequential order for remaining regions of the output map 232, and the output map 232 is thereby generated. In this example, a size of an input map is W1*H1, and a size of an output map is W2*H2, which may be smaller than the size of the input map. The input maps 220 include C input maps, and the output maps 230 include D output maps.

The input maps 220 are represented by a matrix 225. In the matrix 225, one column corresponds to the region 221, which is represented by K^2*C. In the matrix 225, the number of columns is W1*H1, which indicates an entire area of the input maps 220 on which a scan operation is to be performed. The matrix 225 represents input maps 240 through transposition. A length of a vector 241 of the input maps 240 is K^2*C, and N denotes the number of convolution operations needed to generate one output map. Based on a convolution operation between the input maps 240 and weight kernels 250, output maps 260 are generated. The weight kernels 250 correspond to the weight kernels 210, and the output maps 260 correspond to the output maps 230. A size of a weight kernel group 251 corresponds to K^2*C, and the weight kernels 250 include D weight kernel groups. A size of an output map 261 corresponds to W2*H2, and the output maps 260 include D output maps. Thus, D output channels may be formed based on the D weight kernel groups, and a size of a weight kernel group used to generate one output map is K^2*C.

Figure 3:
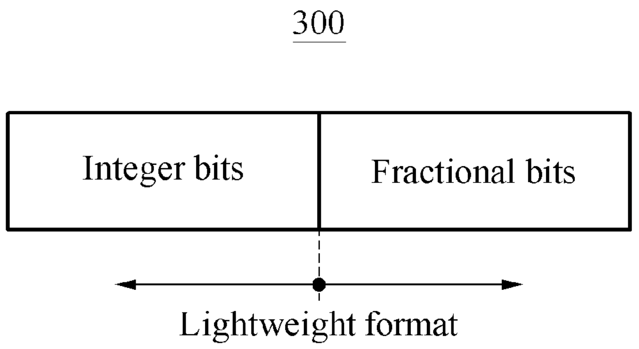
FIG. 3 is a diagram illustrating an example of a lightweight format.

FIG. 3 is a diagram illustrating an example of a lightweight format. In general, data used in a neural network may be represented by a 32 bit floating-point type, and a convolution operation performed to process this data may be a 32 bit*32 bit floating-point MAC operation. An embedded system may transform such a floating-point data type to a fixed-point data type to perform the operation in order to improve a data processing speed and reduce a memory usage. This transformation may also be referred to as a fixed-point transformation. The fixed-point transformation may be a process of redefining functions implemented using decimal fractions as a function associated with an integer operation and then integerizing all decimal-point operations of a floating-point source code. By multiplying a floating-point variable by an appropriate value to produce an integer, an integer operation using an integer operator may be performed. By dividing a result value by the appropriate value that is multiplied, a corresponding floating-point variable may be obtained.

According to an example, a processing apparatus may lighten data based on such a fixed-point transformation. When a floating-point variable is multiplied by an exponent during the fixed-point transformation, the variable may be integerized and the exponent that is multiplied may be defined as a lightweight format. In an example, a computer processes data in binary numbers, and thus an exponent of 2 may be multiplied to integerize a floating-point variable. In this example, the exponent of 2 may indicate a lightweight format. For example, when 2^q is multiplied to integerize a variable X, a lightweight format of the variable X is q. By using an exponent of 2 as a lightweight format, the lightweight format may correspond to a shift operation and an operation speed may thus increase.

Referring to FIG. 3, data 300 includes integer bits and fractional bits. The data 300 may correspond to a weight kernel, an input map, and an output map. By determining a desirable lightweight format based on the data 300, a resolution that may be represented by the data 300 may increase. According to an example, a lightweight format of a weight kernel may be determined for each layer and channel, and a lightweight format of an input map and an output map may be adaptively determined, and thus representation of data may be optimized. Herein, to determine a lightweight format, a maximum value of a dataset and a distribution of the dataset may be used. The distribution of the dataset may include a variance of the dataset. For example, a lightweight format may be determined based on a maximum value of elements and determined in a range in which an overflow does not occur in a result of operations between data based on the distribution of the dataset.

Figure 4:
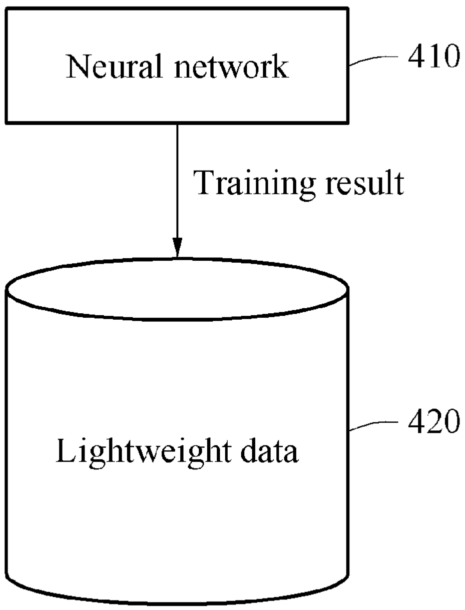
FIG. 4 is a diagram illustrating an example of lightening of a weight kernel.

FIG. 4 is a diagram illustrating an example of lightening of a weight kernel. Referring to FIG. 4, a neural network 410 is trained to obtain a training result. The training result includes a weight kernel for each layer and channel. Lightweight data obtained by lightening the weight kernel is stored in a memory 420. The lightweight data includes a lightweight format of the weight kernel and the lightened weight kernel. The lightweight data is stored for each layer and channel. In an example, the lightweight data is stored in a form of a database, such as, for example, a lookup table, in the memory 420.

FIG. 5 is a diagram illustrating an example of a lookup table including lightweight data. Referring to FIG. 5, a lookup table 500 includes lightweight data for each layer and channel. The lightweight data may include a lightweight format and a lightened weight kernel. As described above, a neural network may include a plurality of layers each including a plurality of channels. In the lookup table 500, $L_u$ indicates layer and $C_{uv}$ indicates channel, in which u denotes an index of layer and v denotes an index of channel. In addition, in the lookup table 500, n denotes the number of layers and m denotes the number of channels included in a layer, for example, $L_1$. For example, as illustrated, layer $L_1$ includes a plurality of channels, for example, $C_{11}$ through $C_{1m}$.

Based on a result of training the neural network, a weight kernel for each layer and channel may be determined, and lightweight data associated with the determined weight kernel may be determined. For example, as illustrated, lightened weight kernel $WK_{11}$ corresponds to channel $C_{11}$ of layer $L_1$, and lightened weight kernel $WK_{12}$ corresponds to channel $C_{12}$ of layer $L_1$. In this example, the lightened weight kernel $WK_{11}$ and the lightened weight kernel $WK_{12}$ may be independently determined. For example, when a weight kernel is determined for channel $C_{11}$, the determined weight kernel is transformed to lightweight format $Q_{11}$ and the lightened weight kernel $WK_{11}$ and they are recorded in the lookup table 500. Similarly, lightweight format $Q_{12}$ and the lightened weight kernel $WK_{12}$ are recorded with respect to channel $C_{12}$, and lightweight format $Q_{1m}$ and lightened weight kernel $WK_{1m}$ are recorded with respect to channel $C_{1m}$. Lightweight formats and lightened weight kernels may also be determined for remaining layers and channels of the layers, and then the determined ones may be stored in the lookup table 500.

The lookup table 500 may be stored in a memory of a processing apparatus, and the processing apparatus may perform a convolution operation using the lookup table 500. For example, as illustrated, the processing apparatus obtains a lightweight format $Q_{uv}$ and a lightened weight kernel $WK_{uv}$ from the lookup table 500 and performs a convolution operation associated with a channel $C_{uv}$ of a layer $L_u$.

Figure 6:
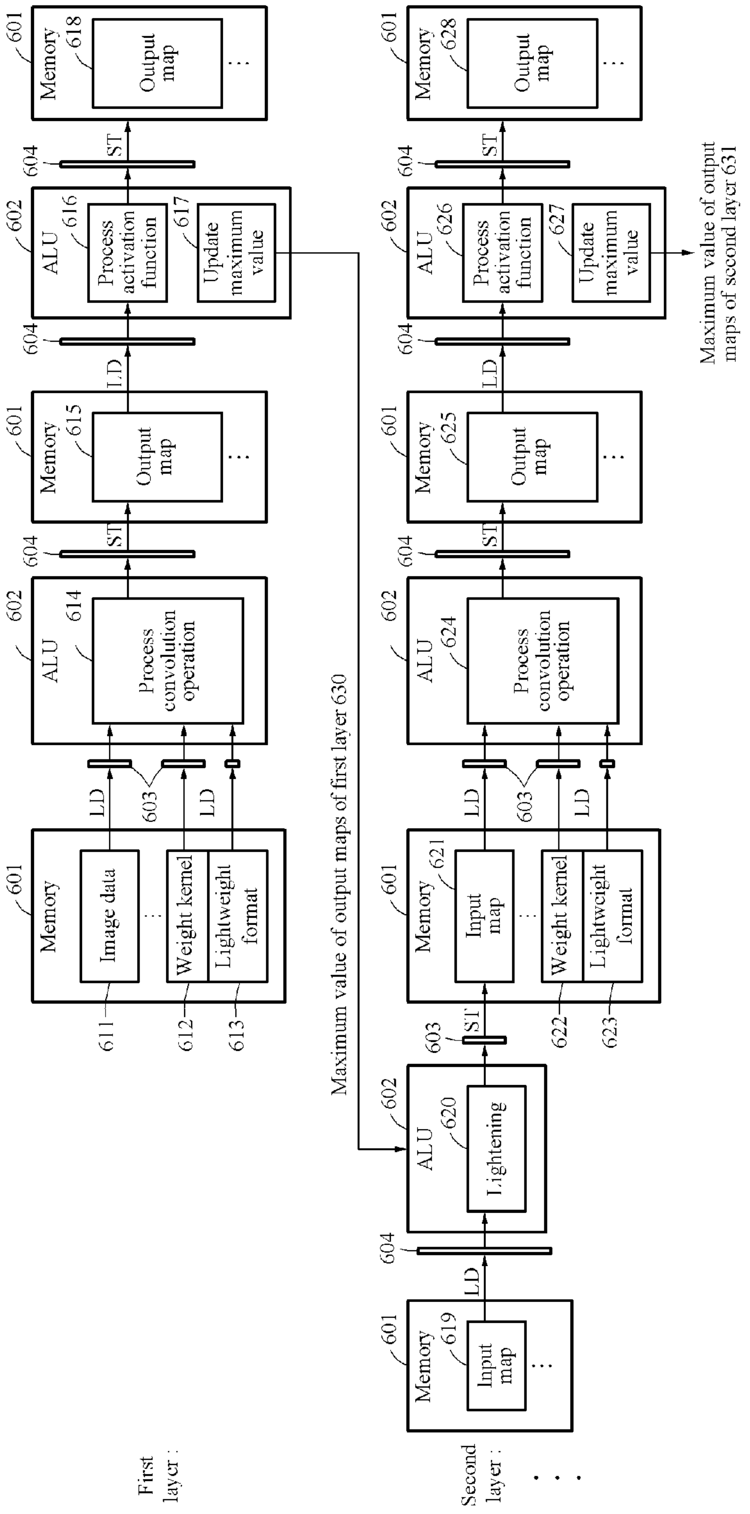
FIG. 6 is a diagram illustrating an example of a dynamic lightening process of activation data.

FIG. 6 is a diagram illustrating an example of a dynamic lightening process of activation data. Although operations performed with respect to a first layer and a second layer of a neural network will be described hereinafter, operations to be performed with respect to subsequent layers of the second layer will not be described and thus the operations performed with respect to the second layer may also be performed with respect to the subsequent layers. An operation of an arithmetic logic unit (ALU) 602 to be described hereinafter may be construed as an operation of a processing apparatus.

Hereinafter, operations to be performed with respect to the first layer will be described.

Referring to FIG. 6, a memory 601 stores image data 611, a weight kernel 612, and a lightweight format 613 of the weight kernel 612. The image data 611 and the weight kernel 612 may all have a low bit width. The first layer may correspond to an input layer of the neural network. In such a case, the image data 611 of an input image obtained through a capturing device may be processed in lieu of an input map. The processing apparatus loads the image data 611 and the weight kernel 612 into a register 603 with a size corresponding to the low bit width. In the example of FIG. 6, LD indicates an operation of loading data from a memory, and ST indicates an operation of storing data in a memory.

In the memory 601, there are weight kernels and lightweight formats for each layer and output channel. For example, the memory 601 may store a lookup table described above with reference to FIG. 5. The processing apparatus loads, from the memory 601, a weight kernel and a lightweight format that are suitable for a channel which is currently being processed. For example, when a first output channel of the first layer is currently being processed, a first weight kernel corresponding to the first output channel may be loaded from the memory 601, and a convolution operation between the image data 611 and the first weight kernel may be performed. When a second output channel of the first layer is currently being processed, a second weight kernel corresponding to the second output channel may be loaded from the memory 601, and a convolution operation between the image data 611 and the second weight kernel may be performed.

In a block 614, the ALU 602 generates an output map 615 by processing a convolution operation between the image data 611 and the weight kernel 612. For example, in a case in which data is lightened to be 8 bits, a convolution operation may be an 8*8 operation. In a case in which data is lightened to be 4 bits, a convolution operation may be a 4*4 operation. A result of the convolution operation, that is the output map 615, may be represented by a high bit width. For example, when the 8*8 operation is performed, a result of the convolution operation may be represented by 16 bits. The processing apparatus stores the output map 615 in the memory 601 through a register 604 with a size corresponding to the high bit width. The processing apparatus loads the output map 615 from the memory 601, and the ALU 602 generates an output map 618 by applying the output map 615 to an activation function in a block 616. The processing apparatus stores the output map 618 with a high bit width in the memory 601 through the register 604 with the high bit width.

The processing apparatus updates a maximum value of output maps of the first layer in a block 617. For example, there may be a register to store a maximum layer of output maps of a layer. The processing apparatus compares an activation function output to an existing maximum value stored in a register, and updates the register to include the activation function output when the activation function output is greater than the existing maximum value stored in the register. When the output maps of the first layer are all processed as described above, a final maximum value 630 of the output maps of the first layer is determined. Since an activation function output is compared to a value in a register, the processing apparatus determines the maximum value 630 without additionally accessing the memory 601 to determine the maximum value 630. The maximum value 630 may be used to lighten an input map of the second layer.

Hereinafter, operations to be performed with respect to the second layer will be described.

The ALU 602 loads an input map 619 from the memory 601. In a block 620, the ALU 602 lightens the input map 619 based on the maximum value 630 of the output maps of the first layer. For example, the processing apparatus determines a lightweight format of the input map 619 based on the maximum value 630, and generates an input map 621 by lightening the input map 619 with a high bit width to have a low bit width based on the determined lightweight format.

That is, the input map 621 may be a lightened version of the input map 619. The processing apparatus lightens the input map 619 having the high bit width to have the low bit width by performing a shift operation on the input map 619 with the high bit width using a value corresponding to the determined lightweight format. Alternatively, the processing apparatus lightens the input map 619 to be the input map 621 by multiplying or dividing the input map 619 by an exponent corresponding to the lightweight format.

An output from the first layer may become an input to the second layer, and thus the output map 618 and the input map 619 may indicate a same activation data. Thus, the lightening of the input map 619 may also be the same as the lightening of the output map 618.

In blocks 624, 626, and 627, operations corresponding to the operations performed in the blocks 614, 616, and 617 may be performed.

The memory 601 stores the input map 621, a weight kernel 622, and a lightweight format 623 of the weight kernel 622. The input map 621 and the weight kernel 622 may all have a low bit width. The second layer receives the output of the first layer and thus processes the input map 621 in lieu of image data. The processing apparatus loads the input map 621 and the weight kernel 622 into the register 603 with a size corresponding to the low bit width.

In the block 624, the ALU 602 generates an output map 625 by processing a convolution operation between the input map 621 and the weight kernel 622. The processing apparatus stores the output map 625 in the memory 601 through the register 604 with a size corresponding to a high bit width. The processing apparatus loads the output map 625 from the memory 601, and the ALU 602 generates an output map 628 by applying the output map 625 to an activation function in the block 626. The processing apparatus stores the output map 628 with a high bit width in the memory 601 through the register 604 with the high bit width.

In the block 627, the processing apparatus updates a maximum value of output maps of the second layer. When the output maps of the second layer are all processed, a final maximum value 631 of the output maps of the second layer is determined. The maximum value 631 may be used to lighten an input map of a third layer, which is a subsequent layer of the second layer.

Figure 7:
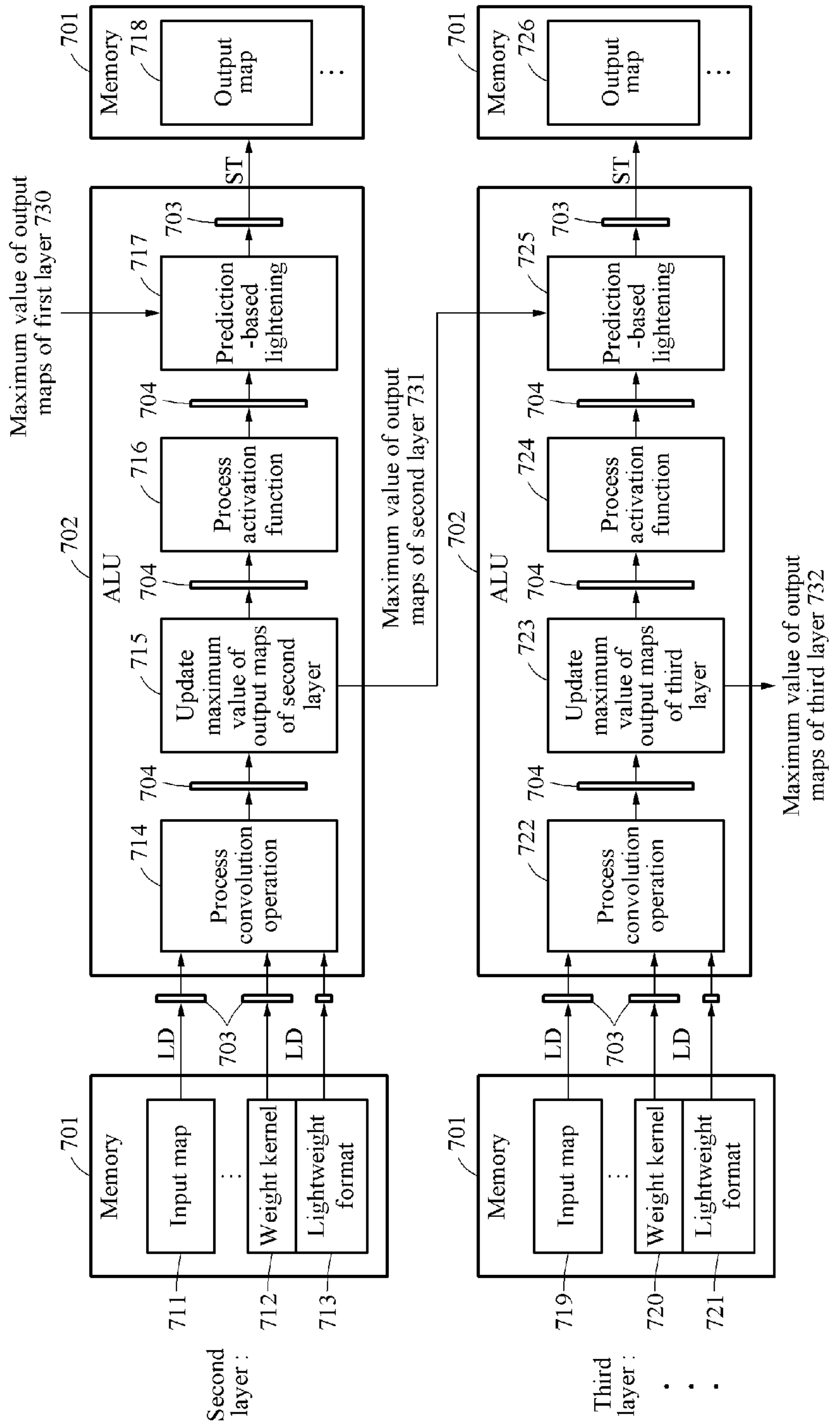
FIG. 7 is a diagram illustrating another example of a dynamic lightening process of activation data.

FIG. 7 is a diagram illustrating another example of a dynamic lightening process of activation data. Although operations performed with respect to a second layer and a third layer of a neural network will be described hereinafter, operations to be performed with respect to subsequent layers of the third layer will not be described and thus the operations performed with respect to the second layer and the third layer may also be performed with respect to the subsequent layers. An operation of an ALU 702 to be described hereinafter may be construed as an operation of a processing apparatus.

Hereinafter, operations to be performed with respect to the second layer will be described.

Referring to FIG. 7, a memory 701 stores an input map 711, a weight kernel 712, and a lightweight format 713 of the weight kernel 712. The input map 711 and the weight kernel 712 may all have a low bit width. The processing apparatus loads the input map 711 and the weight kernel 712 into a register 703 with a size corresponding to the low bit width. In the memory 701, there are weight kernels and lightweight formats for each layer and output channel. For example, the memory 701 may store a lookup table described above with reference to FIG. 5. In the example of FIG. 7, LD indicates an operation of loading data from a memory, and ST indicates an operation of storing data in a memory.

In a block 714, the ALU 702 processes a convolution operation between the input map 711 and the weight kernel 712. A result of the convolution operation, or an output map, may be represented by a high bit width and stored in the register 704 with a size corresponding to the high bit width. In a block 715, the ALU 702 updates a maximum value of output maps of the second layer. For example, a register configured to store a maximum value of output maps of a layer may be present, and the ALU 702 may update the maximum value of the output maps of the second layer based on a result of comparing the result of the convolution operation and an existing maximum value stored in the register. When the output maps of the second layer are all processed, a final maximum value 731 of the output maps of the second layer is determined. The maximum value 731 may be used for prediction-based lightening of an output map of the third layer.

In a block 716, the ALU 702 generates an activation function output by applying the result of the convolution operation to an activation function. In a block 717, the ALU 702 performs prediction-based lightening. For example, the ALU 702 predicts the maximum value of the output maps of the second layer based on the maximum value 730 of the output maps of the first layer, determines a lightweight format for the output maps of the second layer based on the predicted maximum value of the output maps of the second layer, and lightens an activation function output with a high bit width to have a low bit width based on the determined lightweight format for the output maps of the second layer.

To lighten an output map, a maximum value of the output map may need to be determined. For example, when determining the maximum value of the output map after waiting for results of processing all output channels, additional memory access may be needed to determine the maximum value of the output map. In an example, it is possible to immediately lighten an activation function output, or an output map, without a need to wait for a result of processing all output channels by predicting a maximum value of output maps of a current layer based on a maximum value of output maps of a previous layer.

The lightened activation function output has a low bit width and is stored in a register 703 with a size corresponding to the low bit width. The processing apparatus stores, in the memory 701, the lightened activation function output as an output map 718.

Hereinafter, operations to be performed with respect to the third layer will be described.

The memory 701 stores an input map 719, a weight kernel 720, and a lightweight format 721 of the weight kernel 720. The input map 719 and the weight kernel 720 may all have a low bit width. The output map 718 is already lightened in the second layer, and the input map 719 corresponds to the output map 718. The processing apparatus loads the input map 719 and the weight kernel 720 into the register 703 with a size corresponding to the low bit width.

In a block 722, the ALU 702 processes a convolution operation between the input map 719 and the weight kernel 720. A result of the convolution operation, or an output map, may be represented by a high bit width and stored in the register 704 with a size corresponding to the high bit width. In a block 723, the ALU 702 updates a maximum value of output maps of the third layer. When the output maps of the third layer are all processed, a final maximum value 732 of the output maps of the third layer is determined. The maximum value 732 may be used for prediction-based lightening of an output map of a fourth layer which is a subsequent layer of the third layer. When predicting a maximum value of output maps of a subsequent layer, an accurate maximum value of output maps of a previous layer is used, and thus an error in the prediction may not be propagated further to one layer or more.

In a block 724, the ALU 702 generates an activation function output by applying the result of the convolution operation to an activation function. In a block 725, the ALU 702 predicts a maximum value of the output maps of the third layer based on the maximum value 731 of the output maps of the second layer and lightens the activation function output based on the predicted maximum value of the output maps of the third layer. The lightened activation function output has a low bit width and is stored in the register 703 with a size corresponding to the low bit width. The processing apparatus stores, in the memory 701, the lightened activation function output as an output map 726.

In addition, the maximum value 730 of the output maps of the first layer may be determined according to various examples. In an example, the maximum value 730 of the output maps of the first layer may be determined in advance based on various pieces of training data in a training process. In another example, the first layer in the example of FIG. 6 may be the same as the first layer in the example of FIG. 7. In such an example, the maximum value 630 of the output maps of the first layer may correspond to the maximum value 730 of the output maps of the first layer.

Figure 8:
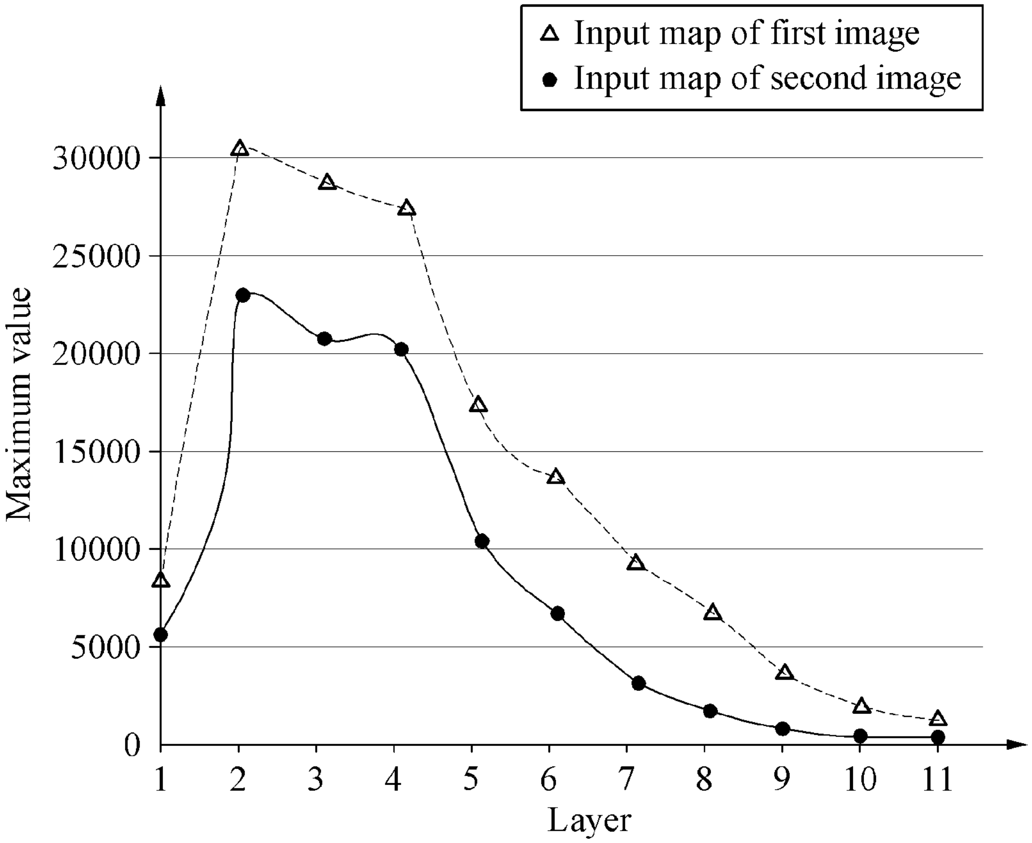
FIG. 8 is a graph illustrating an example of a maximum value distribution of an input map.

FIG. 8 is a graph illustrating an example of a maximum value distribution of an input map. Referring to FIG. 8, a maximum value of an input map may have a constant pattern. An output map of a certain layer may correspond to an input map of a subsequent layer of the layer, and the output map may thus have a same pattern as the input map. As illustrated in FIG. 8, pieces of data of a first image may correspond to, for example, a high-illumination image having relatively greater values, and pieces of data of a second image may correspond to, for example, a low-illumination image having relatively smaller values. An input map of the first image and an input map of the second image may have a similar pattern to each other.

A maximum value of output maps of a current layer may be determined within a reference range based on a maximum value of output maps of a previous layer. The reference range may be conservatively set to minimize a risk such as a numerical error, or actively set to maximize performance such as a resolution. The reference range may be set based on what number of the current layer is. For example, a change in data of layers in an input side may be relatively greater than a change in data of layers in an output side, and thus a reference range in the input side may be relatively conservatively set. Conversely, a change in data of layers in an output side may be relatively smaller than a change in data of layers in an input side, and thus a reference range in the output side may be relatively actively set. For example, in a second layer and a third layer, a maximum value of output maps of a current layer may be set to be +10% of a maximum value of output maps of a previous layer. In a fourth layer, a maximum value of output maps of a current layer may be set to be −20 to 30% of a maximum value of output maps of a previous layer. In a fifth layer, a maximum value of output maps of a current layer may be set to be the same as a maximum value of output maps of a previous layer.

Figure 9:
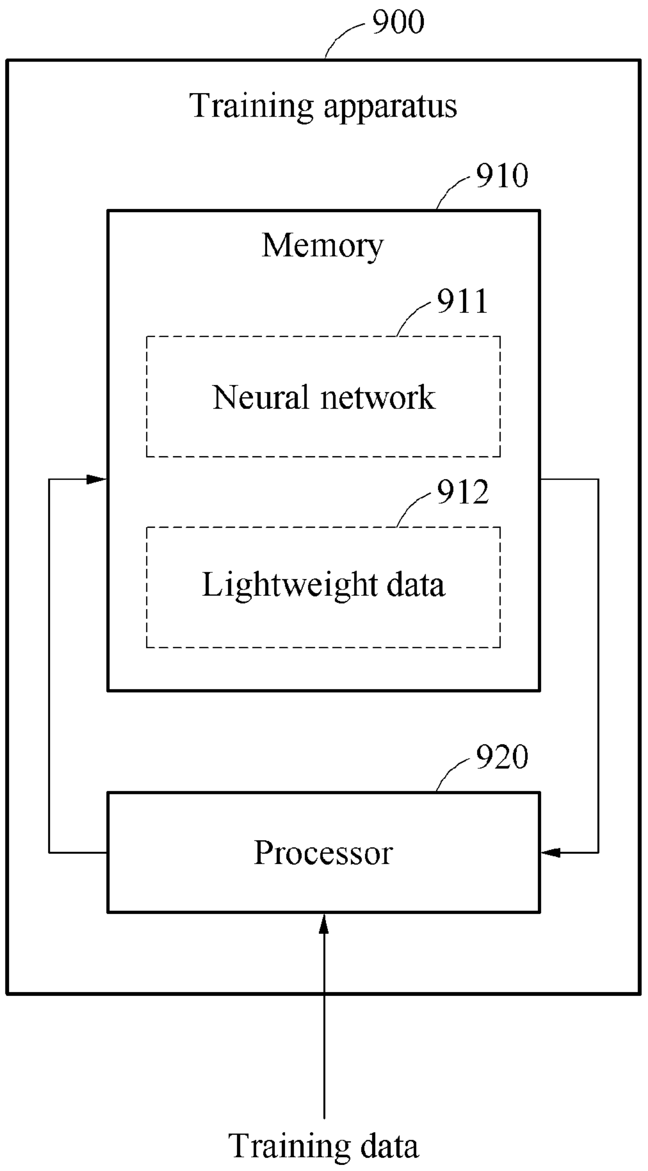
FIG. 9 is a diagram illustrating an example of a training apparatus.

FIG. 9 is a diagram illustrating an example of a training apparatus. Referring to FIG. 9, a training apparatus 900 includes a memory 910 and a processor 920. The memory 910 includes a neural network 911, lightweight data 912, and an instruction that may be read by the processor 920. When the instruction is executed in the processor 920, the processor 920 performs a training operation for the neural network 911. The training operation for the neural network 911 may be indicated as a training process. For example, the processor 920 inputs training data to the neural network 911 and trains a weight kernel of the neural network 911. The processor 920 lightens the trained weight kernel for each layer and channel and stores, in the memory 910, the lightweight data 912 obtained through the lightening. Herein, the lightweight data 912 may include a lightened weight kernel and a lightweight format of the lightened weight kernel. The lightweight data 912 may be stored in a form of a lookup table in the memory 910. For a detailed description of the training apparatus 900, reference may be made to the descriptions provided above with reference to FIGS. 1 through 8.

Figure 10:
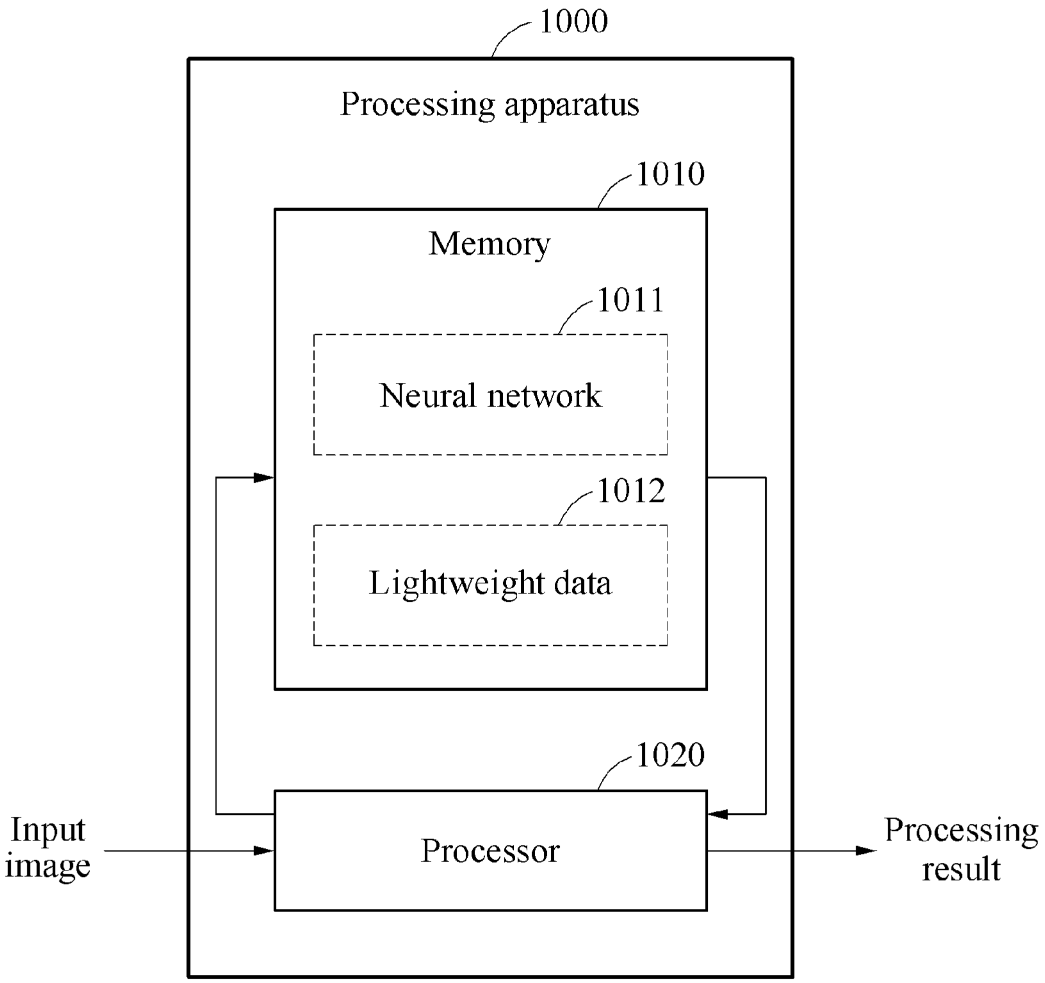
FIG. 10 is a diagram illustrating an example of a processing apparatus.

FIG. 10 is a diagram illustrating an example of a processing apparatus. Referring to FIG. 10, a processing apparatus 1000 includes a memory 1010 and a processor 1020. The memory 1010 includes a neural network 1011, lightweight data 1012, and an instruction that may be read by the processor 1020. When the instruction is executed by the processor 1020, the processor 1020 performs processing using the neural network 1011. The processing using the neural network 1011 may be indicated as an inference process. For example, the processor 1020 inputs an input image to the neural network 1011, and outputs a result of the processing based on an output of the neural network 1011. The result of the processing may include a recognition result or a verification result.

In an example, when the instruction is executed by the processor 1020, the processor 1020 generates output maps of a current layer of the neural network 1011 by performing a convolution operation between input maps of the current layer and weight kernels of the current layer, determines a lightweight format for the output maps of the current layer based on a distribution of at least a portion of activation data that is processed in the neural network 1011, and lightens activation data corresponding to the output maps of the current layer to have a low bit width based on the determined lightweight format. For a detailed description of the processing apparatus 1000, reference may be made to the descriptions provided above with reference to FIGS. 1 through 9.

Figure 11:
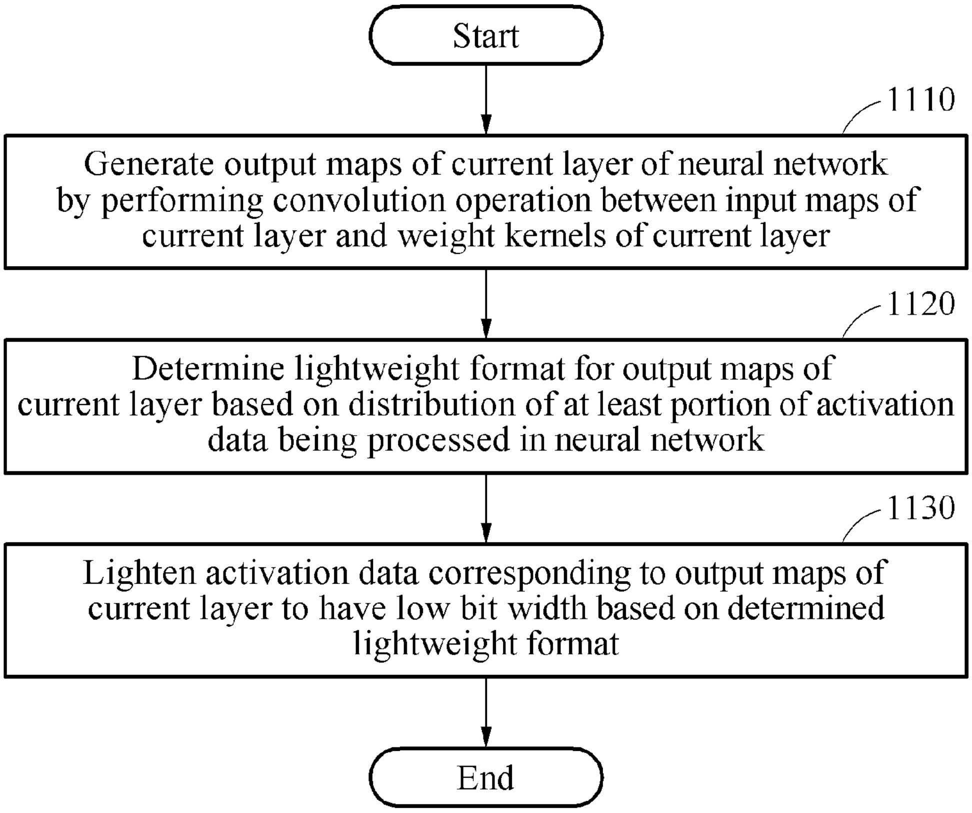
FIG. 11 is a flowchart illustrating an example of a processing method.

FIG. 11 is a flowchart illustrating an example of a processing method. Referring to FIG. 11, in operation 1110, a processing apparatus generates output maps of a current layer of a neural network by performing a convolution operation between input maps of the current layer and weight kernels of the current layer. In operation 1120, the processing apparatus determines a lightweight format for the output maps of the current layer based on a distribution of at least a portion of activation data processed in the neural network. In operation 1130, the processing apparatus lightens activation data corresponding to the output maps of the current layer to have a low bit width based on the determined lightweight format. For a detailed description of the processing method, reference may be made to the descriptions provided above with reference to FIGS. 1 through 10.

Figure 12:
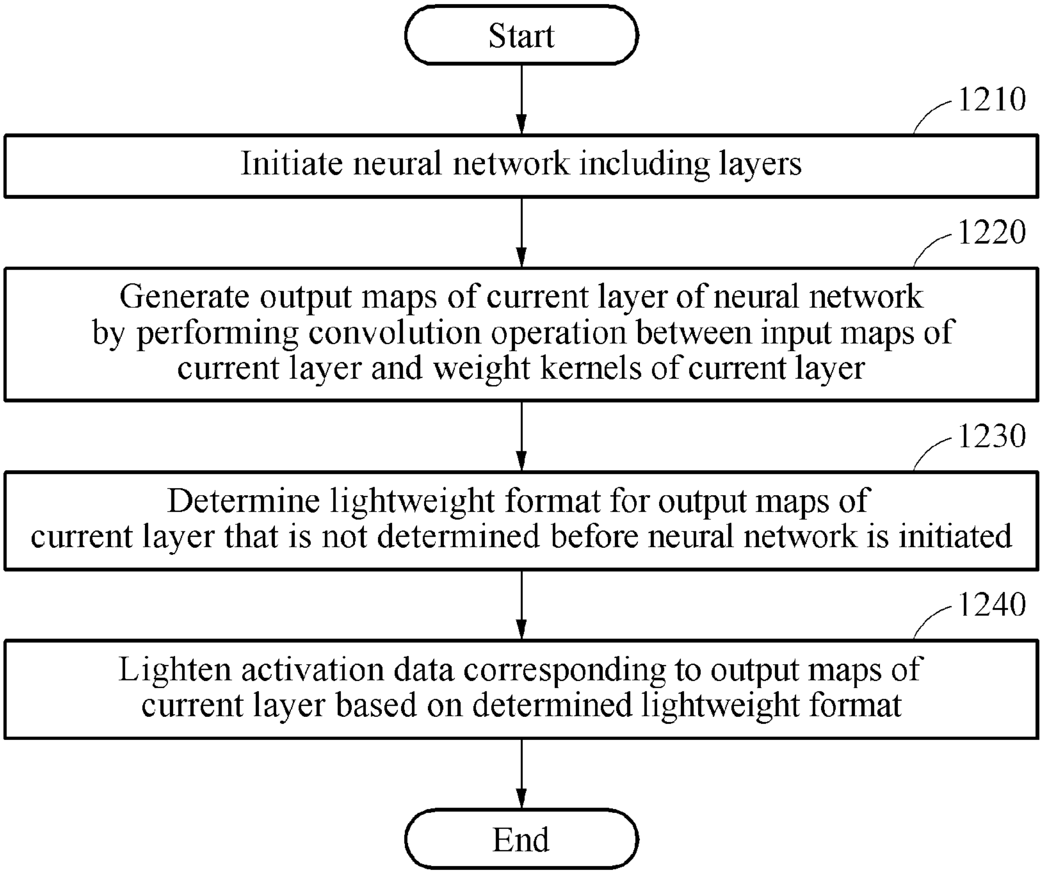
FIG. 12 is a flowchart illustrating another example of a processing method.

FIG. 12 is a flowchart illustrating another example of a processing method. Referring to FIG. 12, in operation 1210, a processing apparatus initiates a neural network including a plurality of layers. In operation 1220, the processing apparatus generates output maps of a current layer of the neural network by performing a convolution operation between input maps of the current layer and weight kernels of the current layer. In operation 1230, the processing apparatus determines a lightweight format for the output maps of the current layer, which is not determined before the neural network is initiated. In operation 1240, the processing apparatus lightens activation data corresponding to the output maps of the current layer based on the determined lightweight format. For a detailed description of the processing method, reference may be made to the descriptions provided above with reference to FIGS. 1 through 11.

The processing apparatus, the training apparatus, and other apparatuses, units, modules, devices, and other components described herein with respect to FIGS. 1, 2, 4, 5, 6, 7, 9, and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 6, 7, 11, and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processing method using a neural network comprising a previous layer, a current layer subsequent to the previous layer, and an output layer that is a last layer, comprising:

generating a predicted maximum value of output maps of the current layer within a reference range that is based on a maximum value of output maps of the previous layer, wherein a width of the reference range is set based on a position of the current layer in the neural network;

obtaining a lightened first weight kernel corresponding to a first output channel that is currently being processed in the current layer by referring to a database, the database includes weight kernels by each layer of the neural network, corresponding output channel, and respective lightweight formats for plural output channels of at least one layer of the neural network;

determining a lightweight format for the output maps of the current layer based on the predicted maximum value which is predicted based on the maximum value of the output maps of the previous layer; and lightening activation data corresponding to the output maps of the current layer to have a lower bit width based on the determined lightweight format for the output maps of the current layer, wherein the determining of the lightweight format is performed without a memory access operation being performed to load the output maps of the current layer resulting from the generating of the output maps of the current layer, wherein the generating of the predicted maximum value of the output maps of the current layer, the determining of the lightweight format for the output maps of the current layer, and the lightening of the activation data corresponding to the output maps of the current layer are implemented within a same forward pass of the neural network, wherein a maximum value of the output maps of a second layer is predicted within a reference range that is based on a maximum value of output maps of a first layer that is previous to the second layer and based on a position of the second layer in the neural network, and wherein a maximum value of the output maps of a third layer is predicted within a reference range that is based on a maximum value of output maps of the second layer and based on a position of the third layer that is different than the position of the second layer in the neural network.

2. The processing method of claim 1, wherein input maps of the current layer of the neural network depend on the output maps of the previous layer, based on the determined lightweight format.

3. The processing method of claim 1, wherein the lightening comprises:

lightening, to have the lower bit width, input maps of a subsequent layer of the neural network, corresponding to the output maps of the current layer, by performing a shift operation on the input maps of the subsequent layer using a value corresponding to the determined lightweight format.

4. The processing method of claim 1, further comprising:

selectively updating a value stored in a register, corresponding to a previous maximum value of output maps of the previous layer of the neural network, based on a comparing of the value stored in the register to respective values of the output maps of the current layer while the convolution operation is being performed, wherein the determining of the lightweight format includes determining the lightweight format based on a value stored in the register after the output maps have been generated, wherein the comparing of the values is performed within the same forward pass.

5. The processing method of claim 1, wherein the lightening comprises:

lightening, to have the lower bit width, the output maps of the current layer by performing a shift operation on the output maps of the current layer using a value corresponding to the determined lightweight format.

6. The processing method of claim 1, further comprising:

updating a register, configured to store a value, to be a maximum value among values of the output maps of the current layer as the output maps are being generated by the convolution operation, wherein a maximum value of output maps of a subsequent layer of the neural network is predicted based on a value stored in the updated register.

7. The processing method of claim 1, wherein the lightened first weight kernel corresponding to the first output channel is lightened on a per-channel basis and stored in the database;

wherein the output maps of the current layer comprises a first output map generated corresponding to the first output channel by a performance of the convolution operation between the input maps of the current layer and the lightened first weight kernel.

8. The processing method of claim 7, wherein the lightened first weight kernel is determined from the database independently of a lightened second weight kernel corresponding to a second output channel of the current layer, and wherein the determining of the lightweight format includes determining respective lightweight formats for each of multiple output maps of the output maps of the current layer, includes determining a lightweight format for the first output map independently of a determining of a lightweight format for a second output map of the output maps of the current layer.

9. The processing method of claim 1, wherein the input maps of the current layer and the weight kernels of the current layer have a bit width that is lower than a bit width of the output maps of the current layer.

10. A non-transitory computer-readable storage medium storing instructions that, when executed by a processor, cause the processor to perform the processing method of claim 1.

11. A processing apparatus using a neural network comprising a previous layer, a current layer subsequent to the previous layer, and an output layer that is a last layer, comprising:

a processor; and a memory including instructions readable by the processor, wherein, when the instructions are executed by the processor, the processor is configured to:

generate a predicted maximum value of output maps of the current layer within a reference range that is based on a maximum value of output maps of the previous layer, wherein a width of the reference range is set based on a position of the current layer in the neural network;

obtain a lightened first weight kernel corresponding to a first output channel that is currently being processed in the current layer by referring to a database, the database includes weight kernels by each layer of the neural network, corresponding output channels, and respective lightweight formats for plural output channels of at least one layer of the neural network;

determine a lightweight format for the output maps of the current layer based on the predicted maximum value which is predicted based on the maximum value of the output maps of the previous layer; and lighten activation data corresponding to the output maps of the current layer to have a lower bit width based on the determined lightweight format for the output maps of the current layer, wherein the determination of the lightweight format is performed without a memory access operation being performed to load the output maps of the current layer resulting from the generating of the output maps of the current layer, wherein the generation of the predicted maximum value of the output maps of the current layer, the determination of the lightweight format for the output maps of the current layer, and the lightening of the activation data corresponding to the output maps of the current layer are implemented within a same forward pass of the neural network, wherein a maximum value of the output maps of a second layer is predicted within a reference range that is based on a maximum value of output maps of a first layer that is previous to the second layer and based on a position of the second layer in the neural network, and wherein a maximum value of the output maps of a third layer is predicted within a reference range that is based on a maximum value of output maps of the second layer and based on a location of the third layer that is different than the position of the second layer in the neural network.

12. The processing apparatus of claim 11, wherein, for the lightening, the processor is configured to: obtain input maps of a subsequent layer of the neural network that corresponds to the output maps of the current layer, and lighten the input maps of the subsequent layer to have the lower bit width based on the determined lightweight format.

13. The processing apparatus of claim 11, wherein the determination of the lightweight format based on the maximum value of the output maps of the current layer is a consideration of the maximum value of the output maps of the current layer, including a comparison of a value stored in a register, corresponding to a previous maximum value of output maps of the previous layer of the neural network, to respective values of the output maps of the current layer while the convolution operation is being performed, and wherein the determination of the lightweight format is based on a result of the comparison of the value stored in the register after the output maps have been generated, wherein the comparing of the values is performed within the same forward pass.

14. The processing apparatus of claim 11, wherein, for the lightening, the processor is configured to:

lighten the output maps of the current layer to have the lower bit width by performing a shift operation on the output maps of the current layer using a value corresponding to the determined lightweight format.

15. The processing method of claim 1, wherein the determined lightweight format controls a value resolution of a distribution in the lightened activation data, such that respective value resolutions of output activation data increase as corresponding maximum values of the distributions decrease.

16. The processing method of claim 1, wherein a reference range of the first layer is determined based on a position of the first layer in the neural network and a reference range of the second layer is determined based on a position of the second layer, where the position of the second layer is different than the position of the first layer and the reference range of the second layer is different than the reference range of the first layer.

17. The processing apparatus of claim 11, wherein a reference range of the first layer is determined based on a position of the first layer in the neural network and a reference range of the second layer is determined based on a position of the second layer, where the position of the second layer is different than the position of the first layer and the reference range of the second layer is different than the reference range of the first layer.

* * * * *